United States Patent
Parekh (10) Patent No.: US 10,621,663 B2
(45) Date of Patent: Apr. 14, 2020

(54) MULTI-BANK ASSET PARTICIPATION STRUCTURE

(71) Applicant: CITIBANK, N.A., New York, NY (US)

(72) Inventor: Konel Parekh, Tarrytown, NY (US)

(73) Assignee: Citibank, N.A., New York, NY (US)

( * ) Notice: Subject to any disclaimer, the term of this patent is extended or adjusted under 35 U.S.C. 154(b) by 1262 days.

(21) Appl. No.: 14/573,842

(22) Filed: Dec. 17, 2014

(65) Prior Publication Data

US 2015/0178828 A1 Jun. 25, 2015

Related U.S. Application Data

(60) Provisional application No. 61/920,605, filed on Dec. 24, 2013.

(51) Int. Cl.
*G06Q 40/02* (2012.01)
*G06Q 40/06* (2012.01)

(52) U.S. Cl.
CPC .......... *G06Q 40/025* (2013.01); *G06Q 40/06* (2013.01)

(58) Field of Classification Search
CPC ......... G06Q 40/02; G06Q 40/06; G06Q 40/04
See application file for complete search history.

(56) References Cited

U.S. PATENT DOCUMENTS

| | | | |
|---|---|---|---|
| 2002/0128958 A1* | 9/2002 | Slone | G06Q 40/04 705/37 |
| 2004/0225597 A1* | 11/2004 | Oppenheimer | G06Q 20/382 705/38 |
| 2004/0225598 A1* | 11/2004 | Goldberg | G06Q 40/00 705/38 |
| 2008/0256082 A1* | 10/2008 | Davies | G06F 17/30545 |

(Continued)

FOREIGN PATENT DOCUMENTS

WO    WO-02057871 A2 *  7/2002  ............. G06Q 20/10

OTHER PUBLICATIONS

Yuliya a. Dvorak, Transplanting Asset Securitization: Is the Grass Green Enough on the Other Side, 38 Hous. L. Rev. 541 (2001).*

(Continued)

*Primary Examiner* — Virpi H Kanervo
(74) *Attorney, Agent, or Firm* — Eric L. Sophir; Foley & Lardner LLP (57) ABSTRACT

A method and system comprising: receiving, by a master program administrator server from a first asset purchasing entity server, a first asset purchasing entity portfolio report on a periodic basis and from a second asset purchasing entity server, a second asset purchasing entity portfolio report on a periodic basis. Transmitting, by the master program administrator server to a program asset administrator server, the first asset purchasing entity portfolio report and the second asset purchasing entity portfolio report, and a central funding entity collection report based on payment collection from the first asset purchasing entity server and the second asset purchasing entity server. Receiving, by the master program administrator server from the program asset administrator server, an analysis report based and transmitting an action item based on the analysis report.

6 Claims, 3 Drawing Sheets

(56) References Cited

U.S. PATENT DOCUMENTS

2011/0196705 A1* 8/2011 Long ................ G06Q 40/02
                                                                                                        705/4

OTHER PUBLICATIONS

European Communication dated Mar. 16, 2016 in European Application No. 14 199 502.7-1958, 5 pages.
Extended European Search Report dated Mar. 25, 2015 corresponding to European Patent Application No. 14199502.7, 5 pages.

* cited by examiner

MULTI-BANK ASSET PARTICIPATION STRUCTURE

CROSS-REFERENCE TO RELATED APPLICATIONS

This application claims priority to U.S. Provisional Application Ser. No. 61/920,605, filed on Dec. 24, 2013, which is herein incorporated by reference in its entirety.

TECHNICAL FIELD

The present disclosure relates to a system for providing a trade finance assets computing platform.

BACKGROUND

Trade finance assets may include import finance, export finance, and other trade finance. In import financing, a participating bank customer finances the acquisition price of goods that it has ordered from an offshore-based exporter. The import financing includes import loans originating from drawings under letters of credit, documentary collections, and open account import transactions.

For an import loan under a letter of credit, an importer opens a letter of credit with a participating bank in favor of an exporter. The exporter is paid by the participating bank upon presentation of the relevant trade documents. The importer reimburses the participating bank.

For an import loan under documentary conditions, importers receive a loan through participating bank documents relating to the trade transaction between the importer and exporter. The participating bank makes payment to the exporter once the importer confirms that the documents are in order. The importer reimburses the participating bank.

For an import loan under an open account basis, the exporter enters into a trade transaction with an importer on an open account basis where the exporter is exposed to the importer's credit risk. The participating bank makes a payment to the exporter on behalf of the importer. The importer reimburses the participating bank.

In export financing, a participating bank customer finances the sale of goods to an offshore-based importer. The export financing includes export loans and open account transactions, as well as bills negotiated under letters of credit.

For bills discounting/negotiation under a letter of credit, the exporter receives a letter of credit issued by a bank or financial institution on behalf of the importer. The exporter presents documents under the letter of credit to a participating bank. The participating bank purchases drafts at a discount drawn by the exporter under the letters of credit. The importer's bank or financial institution reimburses the participating bank. The export loan is made on a full recourse basis against the exporter.

For an export loan under documentary collections, the exporter forwards documents through the participating bank to an importer. The participating bank makes an interest bearing loan to the exporter equivalent to the face amount. The exporter repays the loan amount with the importer's payment.

For export loans under an open account, an exporter enters into a trade transaction with an importer on an open account basis where the exporter is exposed to importer's credit risk. The underlying trade transaction is evidenced by a commercial invoice. The participating bank makes a loan to the exporter and looks to the exporter for reimbursement.

In financial institution financing, a participating bank makes a loan to another financial institution for a specified trade related purpose. The financial institution financing includes loans related to trade activities where a participating bank participates in another financial institution's trade related exposures.

Receivables financing provides the right to payment of the full face amount of trade invoices from the obligor under both the buyer and seller centric models.

The world's financial markets have experienced a dramatic increase in globalization. Global trade has quadrupled in the past 20 years and doubled in the past 10 years. GDP and GDP per capita growth, particularly in emerging markets, are stimulating trade growth. Globalization is increasing exports share of GDP, and emerging economies have contributed over 50% of all export growth. Lower transportation and communication costs have fueled efficient supply chains.

Globalization and consolidation, coupled with a new regulatory regime is resulting in fundamental shifts to the trade business. Basel III proposals will make significant additions to bank capital requirements that could lead banks to re-examine their portfolios and leverage. Business is consolidated with major trade banks, so new flows between developing economies and within regions makes it harder for banks to compete that do not have an extensive branch network, and banks for which trade is not a core business line may determine that the increased capital costs are too expensive to make the business worthwhile. The small and medium enterprise sector may be impacted, as increased capital requirements are felt most strongly with lower rated assets, providing an incentive to go up-market.

Trade finance assets typically have a short tenor of transactions, where the average tenor of all products is about 90 days. There is a low instance of default across all product types, and relatively few defaults were observed through the global economic downturn. The trade finance assets also had good average recovery rates for all product types.

SUMMARY

Generally, the embodiments attempt to provide a solution for securitizing trade finance assets originated or acquired by multiple originators in jurisdictions around the world. More particularly, the embodiments provide a trade finance assets platform for tapping into the Institutional ABS Investor base by issuing rated securities and achieving sale accounting treatment under US GAAP rules and regulations.

Trade finance assets are typically short-term in nature, high in volume, but frequently reflecting a relatively small or highly concentrated group of obligors. These assets also usually involve multiple jurisdictions with different legal regimes affecting the relationships between the originator or acquirer of the assets and the underlying borrowers. Different withholding tax regimes may also apply. All of these characteristics make financing such assets in the capital markets very difficult, especially with most securitization structures being designed to fund longer-term liabilities and not being set up for assets, relating to underlying obligors in dozens of jurisdictions, originated or acquired in more than a half-dozen other jurisdictions. Additionally, in light of changes to the accounting rules made several years ago, the use of traditional securitization structures, even if possible, would generally be unlikely to achieve the desired funding and off-balance sheet treatment under U.S. GAAP. Putting it another way, the systems and methods described herein attempt to provide a solution for securitizing trade finance assets originated or acquired by multiple originators in jurisdictions around the world and does so in a capital and balance sheet efficient manner by achieving off-balance sheet treatment under U.S. GAAP. This is beneficial both for the individual banks involved as well as the industry generally.

The systems and methods described herein attempt to solve the multijurisdictional problem, solve the concentration problem, achieve off-balance sheet treatment under U.S. GAAP, and fund a revolving pool of short-term assets with longer-term liabilities. The systems and methods even contemplate changing funding levels and, if the participating banks so desire, allow them to shift back and forth the amount of funding each uses the program for as well as allowing an individual bank/originator group to dynamically determine which, if any, of its entities and/or branches will provide replacement assets. All of these solutions can be achieved through a combination of a variety of structural features, e.g., CLOs, credit card securitizations, and a master program administrator having the ultimate decision making authority to approve or disapprove workout plans. No existing CLO or credit card structure, even with significant restructuring for these types of assets, can achieve the same results.

The systems and methods described herein have an ability to fund trade finance assets, originated by participating banks, in a capital and balance sheet efficient manner via issuances of rated medium term asset backed securities and short term structured finance debt, which may be through a variable funding note or a money market instrument. Benefits may include being intentionally structured to ensure non-consolidation under FASB and IASB accounting rules, intending to permit participating banks to release regulatory capital, allowing the transfer of portfolio credit risk above retained first loss credit enhancement, demonstrating liquidity of trade assets and establishing alternative funding, and achieving balance sheet efficiencies and improving return ratios.

The system can establish a source of funding for trade finance assets that are short-dated and actively managed, obligations of corporate parties that have public ratings and/or a bank credit score that maps to a public rating, and have a strong performance during the financial crisis. In contrast to a highly concentrated portfolio with a single bank, investors are offered a highly diversified exposure to trade finance assets through contributions from at least two participating banks. Sellers receive balance sheet efficient financing and regulatory capital relief. The system can achieve currency-matched funding for USD-denominated assets through issuance of USD-denominated notes, but could include alternate currency for both assets and liabilities. The system has a master trust designed to serve as a global term funding platform for banks to contribute eligible trade finance assets and issue subsequent series of notes. Interests of investors and sellers are aligned through retention of first-loss program subordinated note, in some cases an issuance of pari-passu interests, and oversight from third party program administrators that can provide objectivity and independence.

An example embodiment of the present disclosure is a method and system comprising: transmitting, by a central funding entity server to a first asset purchasing entity server, a first subordinated note for obtaining a first local security, the first subordinated note absorbing potential losses of the first local security; receiving, by the central funding entity server from the first asset purchasing entity server, the first local security that was issued by the first asset purchasing entity server in response to purchasing a trade finance asset from a first seller; transmitting, by the central funding entity server to a second asset purchasing entity server, a second subordinated note for obtaining a second local security, the second subordinated note absorbing potential losses of the second local security; receiving, by the central funding entity server from the second asset purchasing entity server, the second local security that was issued by the second asset purchasing entity server in response to purchasing a trade finance asset from a second seller; aggregating, by the central funding entity server, a plurality of local securities comprising the first local security and the second local security into a security database record; receiving, by the central funding entity server from a master program administrator server, approval to issue local securities to investors; and issuing, by the central funding entity server, at least a portion of the plurality of local securities from the security database record, the local securities comprising the first local security from the first asset purchasing server and the second local security from the second asset purchasing server to investors.

Another example embodiment of the present disclosure is a method and system comprising: receiving, by the master program administrator server from a program asset administrator server, a first asset purchasing entity portfolio report and a second asset purchasing entity portfolio report, the program asset administrator server receiving the first asset purchasing entity portfolio report and the second asset purchasing entity portfolio report on a periodic basis; receiving, by the master program administrator server from the program asset administrator server, a central funding entity collection report based on payment collection from the first asset purchasing entity server and the second asset purchasing entity server; receiving, by the master program administrator server from the junior program administrator server, a report based at least in part on a comparison of the filtered first asset purchasing entity portfolio report, the filtered second asset purchasing entity portfolio report, and the central funding entity collections report; generating, by the master program administrator server to a central funding entity server, an action item based on the analysis report; and transmitting, by the master program administrator server to a central funding entity server, a request to execute the action item based on the analysis report.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made in detail to the preferred embodiments, examples of which are illustrated in the accompanying drawings. The embodiments described above are intended to be exemplary. One skilled in the art recognizes that numerous alternative components and embodiments that may be substituted for the particular examples described herein and still fall within the scope of the invention.

The systems and methods described herein can fund trade finance assets originated by participating banks. The trade finance assets can be originated in various jurisdictions and can be funded in the manner described below. Participating banks can access an alternative funding source and, subject to accounting and regulatory capital rules applicable to each participating bank, can originate and fund trade finance assets in a capital and balance sheet efficient manner.

Each participating bank (a "seller") will, from time to time, sell trade finance assets to one or more special purpose entities established for the relevant seller (each an "asset purchasing entity" or "APE") in respect of each country that the seller has elected to include in the system. In some cases, due to tax issues, assets with certain underlying obligors will be sold to offshore trusts and entrusted for the benefit of the relevant APE. To address asset rounding and/or risk retention considerations as well as to facilitate replenishment, sellers may retain a vertical interest in one or more of the trade finance assets that it sells into each APE through a seller security issued to that seller by the APE (each, an "APE seller security" and collectively, the "APE seller securities").

Figure 1:
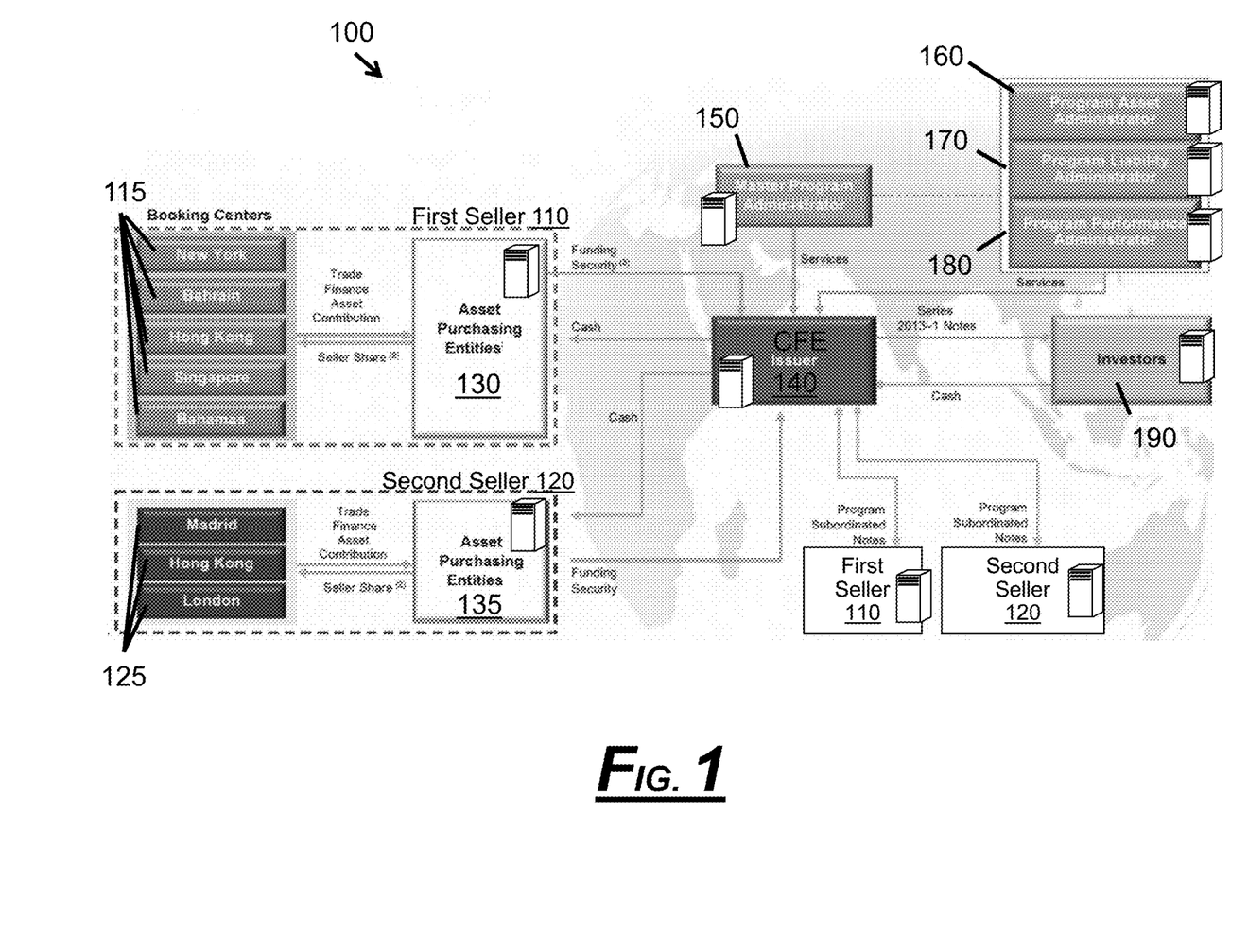
FIG. 1 illustrates a system diagram according to an exemplary embodiment.

Referring to FIG. 1, a system diagram 100 is shown according to an exemplary embodiment. Each participating bank 110, 120 uses a computer system (e.g., a server having a computer-readable memory and a processor executing instructions stored on the memory) to contribute trade finance assets based on structural and eligibility data. Although there are two participating banks 110, 120 shown, it is intended that there can by any number of participating banks. The use of more than one participating bank can increase efficiency and reduce overhead for the other banks involved. Additionally, two sources of assets may also benefit the accounting treatment of these securities. The participating banks 110, 120 (each a "seller") originate and service trade finance assets from established branches and subsidiaries (the "booking centers") 115, 125 in various geographically-centric locations subject to each participating bank's existing underwriting criteria, credit policies, and standard documentation for these types of assets.

In this exemplary embodiment, a first seller 110 has a server that is communicatively coupled to a server in a plurality of booking centers 115 in New York, Bahrain, Hong Kong, Singapore, and Bahamas. Each booking center 115 is communicatively coupled with a server of an APE 130. Each APE 130 is associated with only the first seller 110 and not the second seller 120. Also, each APE 130 may be a special purpose vehicle that can be established by a third party service provider to buy trade finance assets from that particular seller 110 under the laws of jurisdiction of an associated booking center 115. The seller 110 can dynamically allocate assets across the APEs 130. The APEs 130 buy trade finance assets from the seller 110 and issue local securities, and the booking centers 115 receive a seller share plus cash in return. In some instances, the seller 110 may retain a share of the trade finance assets sold to the APEs 130. A funding security (secured note) is provided to an issuer (a central funding entity or "CFE") 140 in return for cash. APEs 130 that purchase trade finance assets from some locations may issue to offshore trusts (not shown), which hold the securities for the benefit of the CFE 140, and the offshore trusts will issue pass-through certificates to the CFE 140 so that the CFE 140 has the same economic experience as owning the securities directly. The APEs 130 can replenish the trade finance assets on a periodic, e.g., weekly, basis.

In one example, a $100 trade finance asset is sold from a New York booking center 115 of the first seller 110 to APE 130, which is an Irish special purpose vehicle. Before the close of business, the New York booking center 115 receives cash from the APE 130. The APE 130 uses the $100 trade finance asset as a basis for issuing a local security to the CFE 140, which is an Irish special purpose vehicle. The CFE 140 amalgamates all of the local securities that it receives from APEs 130, 135, and issues securities to investors 190. Using the $100 from the New York booking center 115, the CFE 140 uses $97 for investors 190 and the remaining $3 for the seller 110 as program subordinated note for a first loss position.

A second seller 120 has a plurality of booking centers 125 in Madrid, Hong Kong, and London. Each booking center 125 is communicatively coupled with a server of an APE 135. Each APE 135 is associated with only the second seller 120 and not the first seller 110. Also, each APE 135 may be a special purpose vehicle that can be established by a third party services provider to buy trade finance assets from that particular seller 120 under the laws of jurisdiction of an associated booking center 125. The seller 120 can dynamically allocate assets across the APEs 135. The APEs 135 buy trade finance assets from the seller 120 and issue local securities, and the booking centers 125 receive a seller share plus cash in return. A funding security (secured note) is provided to the CFE 140 in return for cash. The APEs 135 can replenish the trade finance assets on a periodic, e.g., weekly, basis.

Each APE for a seller can be funded by a CFE subscribing (directly or through one or more intermediary offshore trusts) for an issue of notes ("APE funding securities") issued by that APE, depending on the particular jurisdiction and legal nature of that APE. In the exemplary embodiment, the CFE is an Irish special purpose central funding entity. Payments of interest and principal on the APE funding securities issued by an APE will be made to the CFE by the APE from collections received by it on its trade finance assets (or the portions thereof) allocated to its APE funding security.

The CFE 140 buys all local securities for all seller 110, 120 and pays in cash. The CFE 140 holds seller interest reserve and program enhancement. The assets may be dynamically allocated across seller 110, 120. Short term funding acts as a cushion for liquidity.

The subscription price paid by the CFE 140 for the APE funding securities issued by each APE 130, 135 will be equal to the principal amount outstanding of the trade finance assets held by that APE 130, 135 (net of the APE seller securities allocated amounts) and will be paid in cash. The CFE 140 will fund its purchase of the APE funding securities issued by an APE 130, 135 partly with cash received from selling notes into the capital markets and partly with the subscription moneys received from the seller 110, 120 in consideration for the issue to that seller 110, 120 of a program subordinated note by the CFE 140.

The assets of the CFE 140 (being the APE funding securities (or its rights as the beneficiary of APE funding securities entrusted for its benefit) and various accounts of the CFE) are divided into "asset groups". Each asset group will secure one or more series of instruments issued by the CFE 140 under its funding program.

A first asset group can include local securities issued by APEs that purchase trade finance assets from booking centers of a first participating bank, the seller securities accounts that collect payments from such APE funding securities, and a seller interest reserve account of the first participating bank.

A second asset group can include local securities issued by APEs that purchase trade finance assets from booking centers affiliated with a second participating bank, the seller securities accounts that collect payments from such local securities, and a seller interest reserve account for the second participating bank.

The program subordinated note issued by the CFE 140 to a seller 110, 120 will act as credit enhancement and absorb losses in respect of the trade finance asset portfolio contributed by that seller (regardless of the country that the losses were generated in) up to the face amount of the program subordinated note. The face amount of each program subordinated note will be set at a level required by the rating agencies to support the ratings of the funding program and may differ for each seller depending on (among other factors) the credit quality and geographic location of the obligors of the trade finance assets.

Each seller will provide a cash reserve to cover cash shortfalls on its portfolio. A seller interest reserve account will be established for each seller by the CFE with respect to each series of notes issued by the CFE and will be used to cover shortfalls in cash flow due to timing mismatch to pay interest on such notes. In addition, asset concentration limits will be set on a program portfolio basis, restricting the aggregate exposure to individual obligors, industries and countries.

Principal collections received on the trade finance assets by the APEs relating to a seller at the end of each collection period will be used by the APEs to purchase new trade finance assets from that seller or, to the extent insufficient eligible trade finance assets are available for purchase from that seller, may be used to purchase trade finance assets from other sellers. Each seller will, unless other arrangements are made, continue to service the trade finance assets originated by it and sold by it. It is intended that there may be multiple collection periods and purchase dates during a month.

Interest collections on the trade finance assets contributed by each seller will be used to meet the transaction specific costs relating to that seller, that seller's allocable portion of general expenses and funding costs, as well as excess spread on the relevant program subordinated note.

The methods and systems described herein are implemented on a computer system that communicates over network connections. Each entity has a server, which may be a computing device such as a workstation, personal computer, or a server, and includes a processor and a computer-readable memory having instructions that can be executed by the processor for carrying out a particular operation. The servers communicate over a network connection, which can be a local area network, wide area network, or other network. The network may be public or private, and communications over a public network may be encrypted or otherwise employ data security mechanisms.

As shown in FIG. 1, a master program administrator 150 has a server that is communicatively coupled through a network to a server of the CFE 140 for providing services to the CFE 140. The master program administrator server 150 is also communicatively coupled through a network to a server of each of a program asset administrator 160, a program liability administrator 170, and a program performance administrator 180. The program asset administrator server 160, program liability administrator server 170, and program performance administrator server 180 are each communicatively coupled through a network to the server of the CFE 140.

The master program administrator server 150 is maintained by a third party appointee responsible for overall program management by providing services to the CFE 140 and ensuring that a third party controls and makes decisions regarding the sold assets instead of the seller. The master program administrator server 150 can be provide certain administrative services, including deciding on and monitoring steps to be taken in relation to defaulted trade finance assets. For defaulted assets, the seller 110, 120 is obligated to come up with a workout plan, and the master program administrator 150 considers whether to accept or override the workout plan. The master program administrator server 150 also performs monitoring services and could perform functionality of as an interim back-up junior program administrator.

The system also has junior program administrators to provide administrative services: a program asset administrator 160, a program liability administrator 170, and a program performance administrator 180. If these junior program administrators cannot make a decision due to some breakdown, then the master program administrator has authority to make that decision on their behalf. The master program administrator 150 and the junior program administrators 160, 170, 180 allow for off-balance sheet treatment of these transactions.

The program asset administrator 160 will be responsible for (1) receiving information from sellers in respect of eligible trade finance assets available for sale, (2) preparing and distributing a number of reports to the master program administrator and other transaction parties (including consolidated servicing and asset performance reports based on information received periodically from servicers, consolidated reports detailing collections received by APEs based on information received from servicers and APEs and reports on payments to be made by various transaction parties) and (3) arranging for the making of payments by the CFE. The program asset administrator 160 may be monitoring the system on a weekly basis (or other periodic basis) to ensure that the pool is replenished.

The program performance administrator 180 will be responsible for (1) monitoring whether certain servicer termination events have occurred and for reviewing monthly servicer reports and weekly servicer reports and preparing analysis of the data contained in such reports and (2) performing periodic verifications and audits of the performance of the junior program administrators.

Optionally, the program liability administrator 170 can be responsible for giving directions with regards to certain payments to be made by the CFE. The program liability administrator 170 can also ensure that the VFN funding is done at favorable rates, determine when to roll notes, and determine how much to extend maturity, which are all decisions to made by a party other than the originator. Alternatively, a third party liquidity facility can be procured to backstop only the VFN portion if incorporated in the final funding mix.

Each seller will, pursuant to a program servicing agreement, service the trade finance assets sold or entrusted by it to the APEs for that seller in accordance with program standards and requirements set out in the program servicing agreement.

Upon the occurrence of certain events, a cold, warm, and ultimately a hot back-up servicer may be appointed.

Each seller will represent and warrant as of each purchase date (each such representation and warranty an "asset representation") that each trade finance asset sold or entrusted by it to an APE on such purchase date is an eligible trade finance asset as of the relevant purchase date.

Each seller will provide to the program asset administrator a report and a data tape. The report ("weekly seller asset report") sets out details of (1) the sold assets which will mature during the next report week, and (2) the eligible trade finance assets that it will offer for sale or entrustment to each relevant APE during the next report week, and which local business day during such report week it wishes to effect such sale or entrustment (an "additional purchase date"). Although the exemplary embodiment recites a weekly report, it is intended that the report can be provided on any periodic basis.

The data tape ("weekly data file") sets out certain detailed information in relation to the eligible trade finance assets which have been purchased by each relevant APE during the immediately preceding report week, as specified in the transaction documents.

Adjustments to the books and records of the APEs and the APE securities will be effected thereafter on the basis of the information contained in the weekly data files, which may allow the sellers to manage the sale of trade finance assets daily with a weekly true-up, which is effected prospectively, but as if it had occurred on a real-time basis.

On its initial purchase date, a seller will sell or entrust a portfolio of trade finance assets, each of which meets the eligibility criteria, to each relevant APE for that seller pursuant to the program purchase agreement entered into between such seller and such APEs.

On each additional purchase date, a seller will sell or entrust further trade finance assets, each of which meets the eligibility criteria and identified in the weekly seller asset report as being available for sale on such additional purchase date, to each relevant APE pursuant to the asset purchase agreement to which it is a party.

The purchase price payable for purchases on additional payment dates will be paid for in cash or in-kind or partially in cash and partially in-kind. Where it is paid for fully in-kind, the seller percentage of such eligible trade finance assets so purchased shall be designated as 100% and, accordingly, no additional cash purchase price in respect of such assets is payable to the seller. Where it is paid for partially in-kind, the seller percentage will be increased to reflect the in-kind portion with the remaining portion of the purchase price therefor payable in cash. Where it is paid fully in cash the seller percentage in respect of such purchased assets will be zero. For the avoidance of doubt, any such trade finance assets purchased may be immediately used for the purposes of investor interest pertaining to the investor percentage.

Certain conditions will need to be satisfied before any sale of trade finance assets by a seller to the APEs may be made on an initial purchase date or an additional purchase date, and each seller will represent that such sale is in compliance with these conditions.

Each seller will provide credit enhancement in respect of the APE funding securities issued by its APEs in respect of the underlying trade finance assets by acquiring for cash a program subordinated note issued by the CFE. The level of enhancement required to be contributed may differ for each Seller depending on (among other factors) the credit quality of the obligors of the trade finance assets and the geographic location of the APEs for, and the obligors being contributed by that seller. The credit enhancement provided by a seller will only be used to support losses on APE funding securities issued by its APEs, and not losses on other APE funding securities.

Seller-specific credit enhancement may be required for each participating bank's contributed assets in order to meet transaction rating requirements. The credit enhancement will primarily be in the form of subordination/first loss retained by the seller. Required credit enhancement level and asset eligibility criteria will be determined based on an individual bank's negotiation with the rating agencies and will be affected by factors including historical performance of the relevant bank's portfolio and credit quality of obligors of the bank.

Program-wide credit enhancement may also be required to cover losses not absorbed by seller-specific credit enhancement. The program-wide credit enhancement may be provided by multi-lateral agencies or a third party (either funded or unfunded depending on ratings) and applied pro rata to cover losses.

The sizing of the program subordinated notes will be determined based on rating agency requirements although a higher amount may be purchased if desired, e.g., to comply with risk retention requirements.

Each sold asset will be assigned an "investor percentage" and a "seller percentage" at the time it is transferred to the relevant APE. The seller percentage of a sold asset is the portion of such sold asset which is allocated to the APE seller security. The investor percentage of a sold asset is 100% minus the seller percentage of that sold asset (i.e., the portion thereof allocated to an APE funding security).

The investor percentage and seller percentage of a sold asset may be adjusted from time to time.

A "minimum seller percentage" for each seller will be fixed from time to time by reference to laws and regulations, as applicable, which require risk retention by sponsors of securitization transactions. The minimum risk retention percentage may be zero (such as by a first participating bank) and may differ from seller to seller (e.g., in the case of each seller of a second participating bank it is 5%). The seller percentage for each sold asset of a seller (as determined in accordance with the paragraphs below) shall not fall below the minimum seller percentage.

The "maximum investor percentage" in respect of a seller and a sold asset is 100% minus the minimum seller percentage of that seller.

Figure 2:
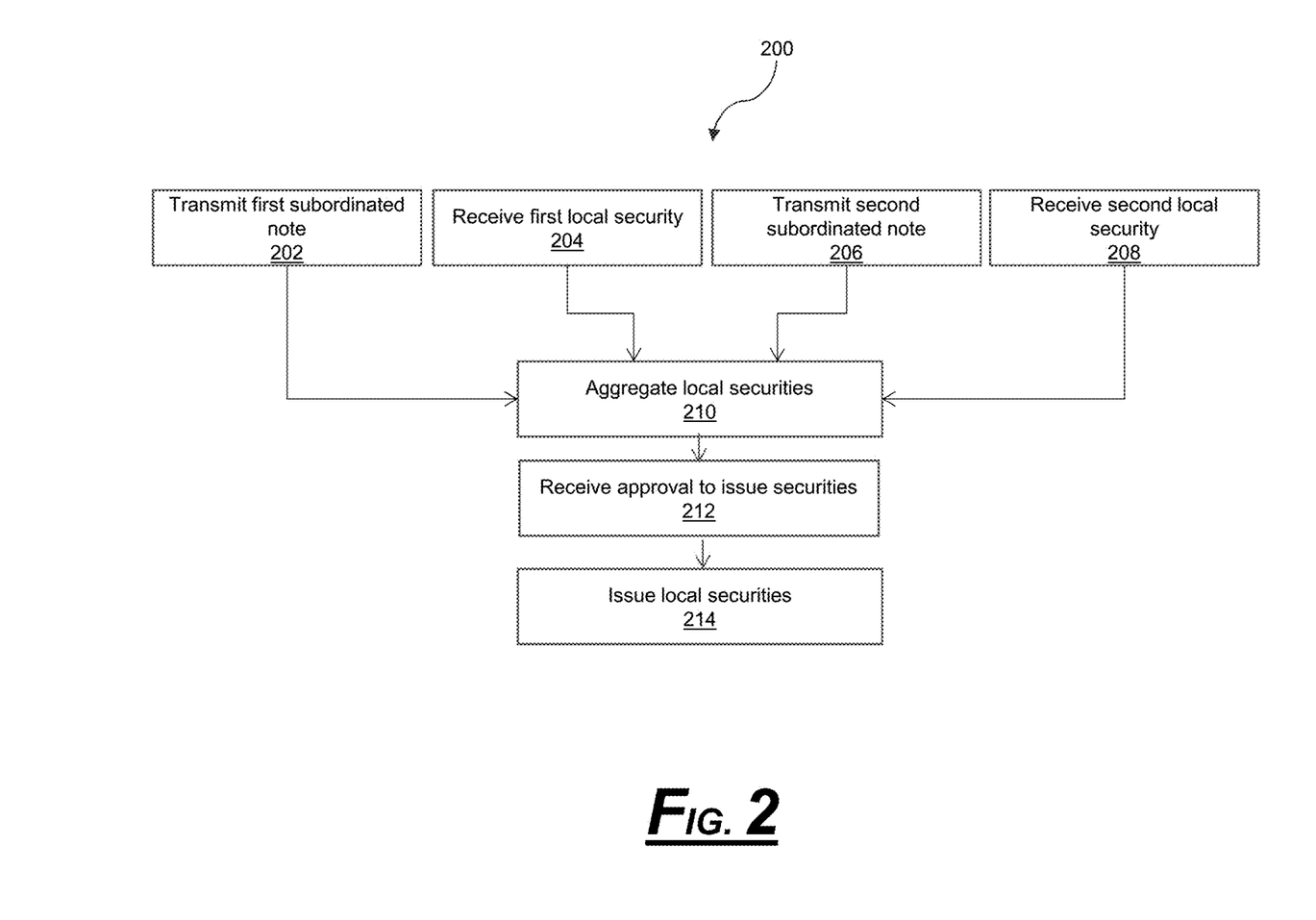
FIG. 2 illustrates a method flowchart according to an exemplary embodiment.

FIG. 2 illustrates a method flowchart 200 according to an exemplary embodiment. This embodiment may incorporate any aspects of other implementations as described in the disclosure. The operations of method 200 presented below are intended to be illustrative. In some embodiments, method 200 may be accomplished with one or more additional operations not described, and/or without one or more of the operations discussed. Some elements of this figure are described above. Thus, any repetitive detailed description thereof will hereinafter be omitted or simplified in order to avoid complication. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 202, during initial issuance of a first subordinated note for obtaining a first local security, the first subordinated note absorbing potential losses of the first local security may be transmitted by a central funding entity server to a first asset purchasing entity server.

At operation 204, the first local security that was issued by the first asset purchasing entity server in response to purchasing a trade finance asset from a first seller may be received by the central funding entity server from the first asset purchasing entity server on a weekly basis and/or any other periodic basis. In some implementations, the first asset purchasing entity server may be associated with only the first seller and not the second seller. In an exemplary embodiment, the first seller has a first plurality of booking centers communicatively coupled with the first asset purchasing entity server, the first plurality of booking centers dynamically allocating the trade finance asset across the first asset purchasing entity and receiving a share of the trade finance asset.

At operation 206, during initial issuance of a second subordinated note for obtaining a second local security, the second subordinated note absorbing potential losses of the second local security may be transmitted by the central funding entity server to a second asset purchasing entity server.

At operation 208, the second local security that was issued by the second asset purchasing entity server in response to purchasing a trade finance asset from a second seller may be received by the central funding entity server from the second asset purchasing entity server on a weekly basis and/or any other periodic basis. In some implementations, the second asset purchasing entity server is associated only with the second seller and not the first seller. In an exemplary embodiment, the second seller has a second plurality of booking centers communicatively coupled with the second asset purchasing entity server, the second plurality of booking centers dynamically allocating the trade finance asset across the second asset purchasing entity and receiving a share of the trade finance asset.

At operation 210, a plurality of local securities comprising the first local security and the second local security into a security database record may be aggregated by the central funding entity server.

At operation 212, approval to issue local securities to investors may be received by the central funding entity server from a master program administrator server.

At operation 214, at least a portion of the plurality of local securities comprising the first local security from the first asset purchasing server and the second local security from the second asset purchasing server to investors, the securities supplied from the security database record may be issued by the central funding entity server.

Figure 3:
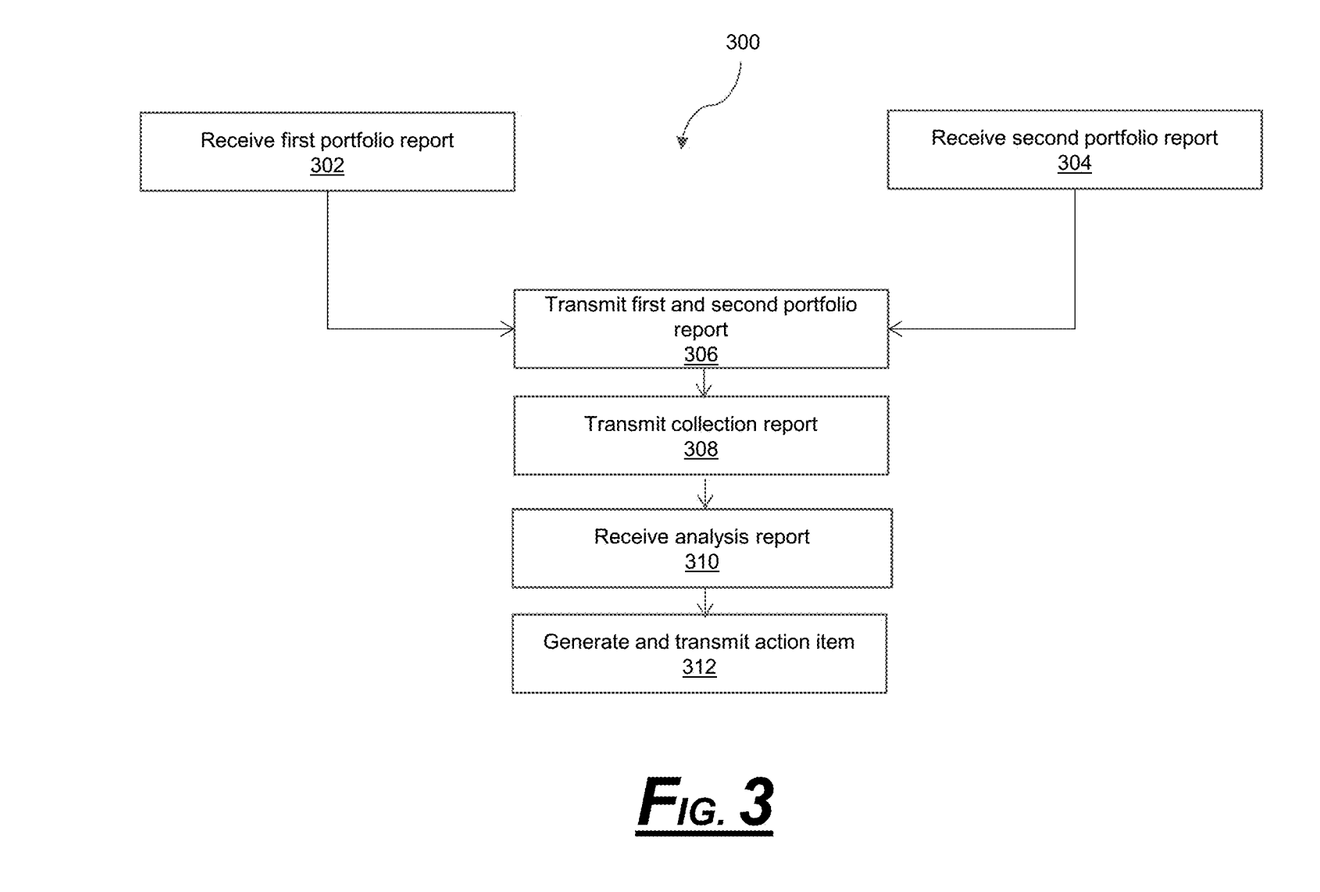
FIG. 3 illustrates a method flowchart according to an exemplary embodiment.

FIG. 3 illustrates a method flowchart 300 according to an exemplary embodiment. This embodiment may incorporate any aspects of other implementations as described in the disclosure. The operations of method 300 presented below are intended to be illustrative. In some embodiments, method 300 may be accomplished with one or more additional operations not described, and/or without one or more of the operations discussed. Some elements of this figure are described above. Thus, any repetitive detailed description thereof will hereinafter be omitted or simplified in order to avoid complication. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 302, a first asset purchasing entity portfolio report on a periodic basis may be received by a program administrator server from a first asset purchasing entity server.

At operation 304, a second asset purchasing entity portfolio report on a periodic basis may be received by the program administrator server from a second asset purchasing entity server.

At operation 306, the first asset purchasing entity portfolio report and the second asset purchasing entity portfolio report may be transmitted by the program administrator server to a master program administrator server.

At operation 308, a central funding entity collection report based on payment collection from the first asset purchasing entity server and the second asset purchasing entity server may be transmitted by the program administrator server to the master program administrator server.

At operation 310, a report based at least in part on a comparison of the filtered first asset purchasing entity portfolio report, the filtered second asset purchasing entity portfolio report, and the central funding entity collections report may be received by the master program administrator server from the junior program administrator server.

At operation 312, an action item based on the analysis report may be generated by the master program administrator server to a central funding entity server. In one example, the action item may be transmitting payment instructions to the central funding entity server, the payment instructions comprising the timing of rolling notes to an investor. In another example, the action item may be transmitting payment instructions to the central funding entity server, the payment instructions comprising the amount to extend maturity to an investor. The master program administrator server transmits a request to the central funding entity server to execute the action.

In some implementations, upon the analysis report indicating defaulted trade assets from a first seller, the master program administrator server may receive a workout plan from the first seller and transmit an override of the workout plan from the first seller. In other embodiments, upon the analysis report indicating defaulted trade assets from a second seller, the master program administrator server may receive a workout plan from the second seller and transmit an override of the workout plan from the second seller.

The embodiments described above are intended to be exemplary. One skilled in the art recognizes that numerous alternative components and embodiments that may be substituted for the particular examples described herein and still fall within the scope of the invention.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "measuring" or "selecting" or "displaying" or "identifying" or "detecting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of programming languages include HTML5, Flash and other similar languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram including but not limited to the combining first seller 110, second seller 120, program subordinate notes and/or the steps (or operations) described therein without departing from the spirit of the disclosure. For instance, the steps may be performed in a differing order or steps may be added, deleted or modified. All of these variations are considered a part of the claimed disclosure.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method comprising:
  transmitting, by a central funding entity server to a first asset purchasing entity server, a first subordinated note for obtaining a first local security, the first subordinated note absorbing potential losses of the first local security;
  upon a first plurality of booking center servers of a first seller and distributed within a first set of geographic locations dynamically allocating a trade finance asset across a first asset purchasing entity and receiving a share of the trade finance asset, receiving, by the central funding entity server from the first asset purchasing entity server communicatively coupled to the first plurality of booking center servers, the first local security that was issued by the first asset purchasing entity server in response to purchasing the trade finance asset from the first seller, wherein each of the first plurality of booking center servers is configured based on one or more requirements of a respective geographic location;

transmitting, by the central funding entity server to a second asset purchasing entity server, a second subordinated note for obtaining a second local security, the second subordinated note absorbing potential losses of the second local security;

upon a second plurality of booking center servers of a second seller and distributed within a second set of geographic locations distinct from the first set of geographic locations dynamically allocating the trade finance asset across a second asset purchasing entity and receiving a share of the trade finance asset, receiving, by the central funding entity server from the second asset purchasing entity server communicatively coupled to the second plurality of booking center servers, the second local security that was issued by the second asset purchasing entity server in response to purchasing the trade finance asset from the second seller, wherein each of the second plurality of booking center servers is configured based on one or more requirements of a respective geographic location;

aggregating, by the central funding entity server, a plurality of local securities comprising the first local security and the second local security into a security database record;

receiving, by the central funding entity server from a master program administrator server, approval to issue local securities to investors; and issuing, by the central funding entity server, at least a portion of the plurality of local securities from the security database record, the local securities comprising the first local security from the first asset purchasing server and the second local security from the second asset purchasing server to the investors.

2. The method of claim 1, wherein the first asset purchasing entity server is associated with only the first seller and not the second seller.

3. The method of claim 1, wherein the second asset purchasing entity server is associated only with the second seller and not the first seller.

4. A system comprising:
one or more computer processors;
a memory containing a program which, when executed by the one or more computer processors, is configured to perform an operation comprising:

transmit, by a central funding entity server to a first asset purchasing entity server, a first subordinated note for obtaining a first local security, the first subordinated note absorbing potential losses of the first local security;

upon a first plurality of booking center servers of a first seller and distributed within a first set of geographic locations dynamically allocating a trade finance asset across a first asset purchasing entity and receiving a share of the trade finance asset, receiving, by the central funding entity server from the first asset purchasing entity server communicatively coupled to the first plurality of booking center servers, the first local security that was issued by the first asset purchasing entity server in response to purchasing the trade finance asset from the first seller, wherein each of the first plurality of booking center servers is configured based on one or more requirements of a respective geographic location;

transmit, by the central funding entity server to a second asset purchasing entity server, a second subordinated note for obtaining a second local security, the second subordinated note absorbing potential losses of the second local security;

upon a second plurality of booking center servers of a second seller and distributed within a second set of geographic locations distinct from the first set of geographic locations dynamically allocating the trade finance asset across the second asset purchasing entity and receiving a share of the trade finance asset, receive, by the central funding entity server from the second asset purchasing entity server communicatively coupled to the second plurality of booking center servers, the second local security that was issued by the second asset purchasing entity server in response to purchasing the trade finance asset from the second seller, wherein each of the second plurality of booking center servers is configured based on one or more requirements of a respective geographic location;

aggregate, by the central funding entity server, a plurality of local securities comprising the first local security and the second local security into a security database record;

receive, by the central funding entity server from a master program administrator server, approval to issue local securities to investors; and issue, by the central funding entity server, at least a portion of the plurality of local securities from the security database record, the local securities comprising the first local security from the first asset purchasing server and the second local security from the second asset purchasing server to the investors.

5. The system of claim 4, wherein the first asset purchasing entity server is associated with only the first seller and not the second seller.

6. The system of claim 4, wherein the second asset purchasing entity server is associated only with the second seller and not the first seller.

* * * * *